United States Patent [19]

Yashima et al.

[11] Patent Number: 4,700,795
[45] Date of Patent: Oct. 20, 1987

[54] MOTORCYCLE WITH AN ENCLOSED BATTERY MOUNTED TO HAVE A PREDETERMINED ANGULAR RELATION WITH RESPECT TO THE BODY FRAME

[75] Inventors: Michio Yashima, Kawagoe; Shuji Takahashi, Saitama, both of Japan

[73] Assignee: Honda Giken Kogyo Kabushiki Kaisha, Tokyo, Japan

[21] Appl. No.: 817,113

[22] Filed: Jan. 8, 1986

Related U.S. Application Data

[63] Continuation of Ser. No. 532,225, Sep. 14, 1983, abandoned.

[30] Foreign Application Priority Data

Sep. 14, 1982 [JP] Japan ................................ 57-160666

[51] Int. Cl.⁴ .............................................. B60K 1/04
[52] U.S. Cl. .................................. 180/68.5; 180/219; 429/60
[58] Field of Search ............... 180/68.5, 65.6, 220, 180/219, 65.8; 296/78.1; 206/333; 224/32 R; 429/100, 57, 97, 99, 60; 220/23; 174/52 R; 70/258, 230

[56] References Cited

U.S. PATENT DOCUMENTS

| | | | |
|---|---|---|---|
| 1,644,641 | 10/1927 | Bender | 180/68.5 |
| 2,109,316 | 2/1938 | Harley | 180/219 |
| 2,504,265 | 4/1950 | Jozif | 180/68.5 |
| 4,031,293 | 6/1977 | Voss et al. | 429/60 |
| 4,044,852 | 8/1977 | Lewis et al. | 180/206 |
| 4,077,485 | 3/1978 | Bonora et al. | 180/65.6 |
| 4,565,750 | 1/1986 | Isoi et al. | 429/72 |

FOREIGN PATENT DOCUMENTS

2124274  11/1972  Fed. Rep. of Germany ..... 180/68.5

Primary Examiner—John J. Love
Assistant Examiner—Mitchell J. Hill
Attorney, Agent, or Firm—Birch, Stewart, Kolasch & Birch

[57] ABSTRACT

A motorcycle equipped with an enclosed battery having a closed structure, is characterized by installing the enclosed battery in a manner that a side face of a battery case makes an angle with a vertical direction of a body frame of the motorcycle. With this arrangement of the enclosed battery, it becomes possible to reduce the space for housing the battery or to utilize a so-called dead space, thereby reducing the size or the width of a body frame and improving the functional structure of the motorcycle.

2 Claims, 22 Drawing Figures

MOTORCYCLE WITH AN ENCLOSED BATTERY MOUNTED TO HAVE A PREDETERMINED ANGULAR RELATION WITH RESPECT TO THE BODY FRAME

This application is a continuation of copending application Ser. NO. 532,225, filed on Sept. 14, 1983, abandoned.

BACKGROUND OF THE INVENTION

1. Field of the Invention

The present invention relates to a motorcycle and more particularly to a motorcycle on which an enclosed battery is mounted.

2. Description of Background Information

In an existing battery mounted on a motorcycle, water contained in electrolyte is electrolyzed during overcharging and turned into oxygen gas at positive plates and into hydrogen gas at negative plates. Since the evaporation of the thus generated gases causes a reduction of the quantity of the electrolyte, the replenishment of distilled water or the like is required. In addition, due to the evolution of antimony (Sb) from the plate material, a local battery is formed and an internal discharge takes place. Therefore an additional charging is required after a nonuse of a long time. With these reasons, the location for installing the battery on a body frame of the motorcycle is limited to such a location that allows an easy access for the maintenance. Moreover, due to the necessity of providing a vent hole for exhausting the oxygen gas and the hydrogen gas respectively generated at the positive plates and at the negative plates, it was impossible to adopt a completely enclosed construction. If the battery is placed at a slant or laid sideways, the electrolyte leaks. Therefore the state of the installation of the battery in the body frame was restricted to a normal upright arrangement. Such restrictions of the location of installation and the state of installation have been a hindrance to the reduction in size or the slimming of the body frame.

On the other hand, a maintenance-free battery of the enclosed type (referred to as enclosed battery hereinafter) has been developed to eliminate the need of the replenishment of water during a normal life of the battery. The enclosed battery generally has a closed type battery casing and there is much more freedom of setting as compared with the conventional open type battery.

SUMMARY OF THE INVENTION

The present invention is based on the above described characteristics of the enclosed battery and an object of the present invention is to provide a motorcycle having a structural form which allows to reduce the size or the width of a body by using an enclosed battery and effectively utilizing a smaller space or so-called dead space of the body of the motorcycle.

In order to attain this object, according to the invention, the enclosed battery having a battery case and positive and negative plates housed therein in a vertical direction of the battery case is installed on a frame of the motorcycle in a manner that a side face of the battery case makes an angle with a vertical direction of the frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, in which.

DETAILED DESCRIPTION OF THE PREFERRED EMBODIMENTS

Figure 1:
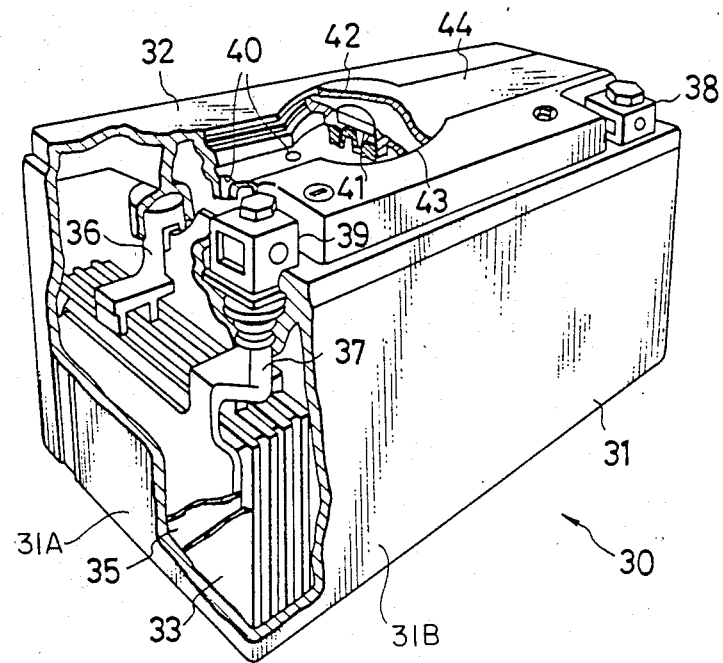
FIG. 1 is a partially cutaway view of an enclosed battery to be installed in the motorcycle according to the present invention.

Before explaining the embodiments of the present invention, reference is first made to FIG. 1 in which an example of the structure of the enclosed battery is illustrated. As shown, the enclosed battery generally designated by 30 includes a battery case 31, a cover 32 which covers a top portion of the battery case 31. The battery case 31 includes first side faces 31A and second larger side faces 31B. In the battery case 31, there are provided a plurality of positive plates 33, parallel to first side faces 31A, made of lead and lead-calcium alloy, two plates per cell. Similarly, a plurality of negative plates 34 also made of lead and lead-calcium alloy are disposed, three plates per cell. In each space between a positive plate 33 and a negative plate 34, there is provided a separator 35 made of cotton-like glass fibers, diameter of each fiber being less than 1m $\mu$. The two positive plates 33 of each cell are connected with each other by means of a plate post 36 straddling at top end portions thereof. Similarly, the three negative plates 34 of each cell are connected with each other by means of a plate post 37 straddling at top end portions thereof. Further, the enclosed battery is provided with a positive termimal 38 and a negative terminal 39 on the cover 32. Each cell is provided with a vent hole 40 which opens in a groove portion formed in the cover 32. The groove is covered by an inner lid 43 and an upper lid 44 is placed above the inner lid 43. In the middle of the groove, there is provided a rubber valve 41 which is to be lifted up by means of the exhaust gas from the vent holes 40 and allows it to escape through a filter 42, the space between the inner lid and the upper lid, and through a pair of openings formed at both sides of the upper lid 44.

In the case of a battery having such a construction, the rubber valve 41 is disposed in the exhaust passage, so as to provide a completely closed structure in which the evaporation of water in the electrolyte is prevented. As for the resolution of water, a measure is taken so as to maintain the negative plates at a discharging condition and to prevent the generation of the hydrogen gas. Along with this measure, by utilizing a so called oxygen cycle in which the negative plates are exposed to the oxygen gas produced at the positive plates, the need of the replenishment of the water is eliminated. In addition, the formation of the local battery due to the evolution of antimony is prevended by using a calcium alloy as the material of plates, and consequently, the self discharge is minimized to eliminate the need of additional charge after a nonuse for a long time. Further, the electrolyte is prevented from leaking by using a fine glass mat.

It will be understood from the foregoing that the enclosed battery is formed as the so called maintenance free battery for which the replenishment of water and the additional charge are not required. Moreover, since the leaking of the electrolyte does not occur even if the battery case is disposed obliquely or laid sideways, there is no limitations of the location and the state of installation in the body of the motorcycle.

An embodiment of the battery mounting structure according to the present invention will be explained hereinafter with referece to the accompanying drawings.

Figure 2:
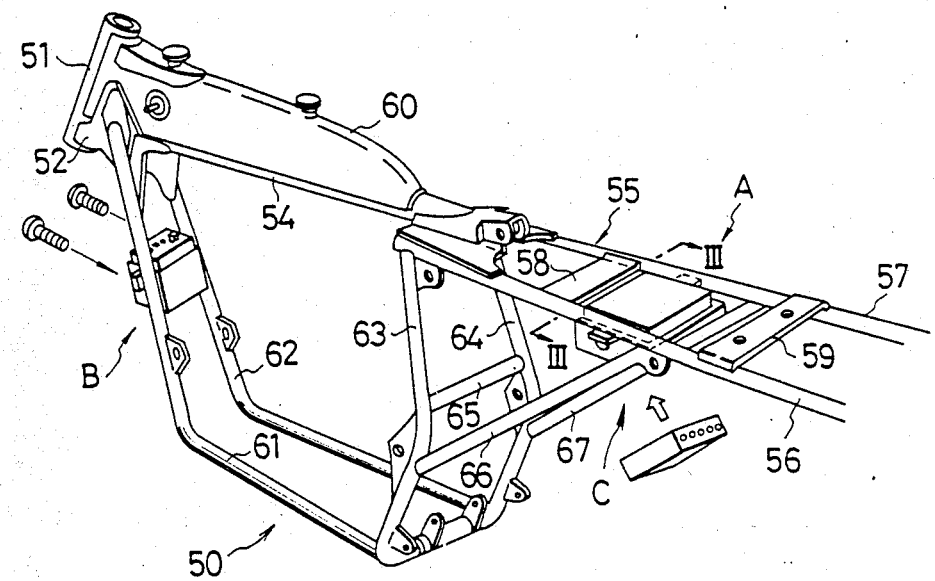
FIG. 2 is a perspective view of a cradle type frame of a motorcycle showing various locations for installing the enclosed battery.

Reference is first made to FIG. 2, in which a state of installing the enclosed battery in a cradle type frame of a motorcycle is illustrated.

As shown, the frame generally designated by 50 includes a head pipe 51 into which a steering column (not shown) is inserted. A main pipe 54 is welded to the head pipe 51 and stays 52 and 53 are also welded to the head pipe 51. The main pipe 54 extends rearwardly and, a fork shaped back frame generally designated by 55 is welded at the rear end thereof. The back frame 55 consists of a pair of pipes 56, 57 arranged substantially parallel with each other and a plurality of cross members 58 and 59 which fix the pipes 56, 57 together. Further, the main pipe 54 is reinforced by a gusset 60 welded through the whole length thereof.

A pair of down tubes 61 and 62 having generally L-shaped configuration are welded to the head pipe 54 via the stays 52 and 53 and the rear ends thereof are respectively connected to a lower end portion of left and right pillars 63 and 64. The left and right pillars 63 and 64 are respectively connected, at an upper end thereof, to each side of the front end portion of the back frame 55. The left and right pillars 63 and 64 are connected with each other at middle portions thereof by means of a cross member 65, and folded at this portions so that the lower halves thereof slightly bend forward. In addition, a pair of back stays 66 and 67 are respectively welded to a halfway portion of the pipes 56, 57 and to a halfway portion of the left and right pillar 63 and 64. An engine (not shown) is received in a frame structure formed by the main pipe 54, down tubes 61 and 62, and the left and right pillars 63 and 64.

In the case of the enclosed battery housing the plates in the vertical direction as shown in FIG. 1 in a frame of motorcycle having a structure described above, the location for installing the enclosed battery may be selected from such a position between the pipes 56 and 57 of the back frame (location A), a position between obliquely disposed front halves of the down tubes 61, 62 (location B), or a position between the back stays 66 and 67 (location C).

Figure 3:
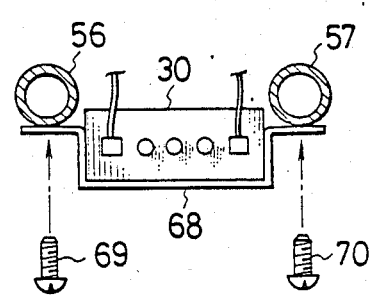
FIG. 3 is a cross sectional view taken along a line III—III of FIG. 2, showing the manner of installing the enclosed battery in a location A shown FIG. 2.

In the case of the location A, as shown in FIG. 3 a support member 68 is fixed to the pipes 56, 57 by means of screws 69, 70 so that the closed battery 30 is received and held sideways in the support member 68. In this state, a side face of the enclosed battery 30 is substantially parallel to the pipes 56 and 57 and therefore substantially normal to the vertical direction of the body of the motorcycle.

In the case of the location B, as shown in FIG. 2 the enclosed battery 30 is received and held by a support member 71 which is fixed to the obliquely arranged front halves of the down tubes 61 and 62 by means of screws 72, 73. Therefore, in this state, the enclosed battery 30 is disposed substantially parallel to the down tubes 61 and 62.

Figure 4:
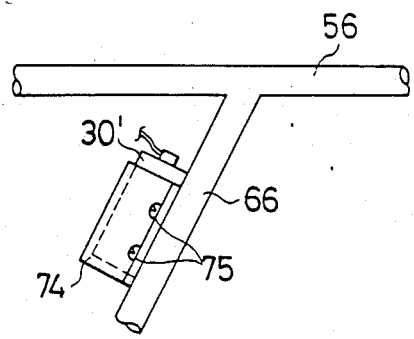
FIG. 4 is a side view showing the installed state of the enclosed battery in a location C shown in FIG. 2.

In the case of the location C, as shown in FIG. 4 the enclosed battery 30' is received and supported by a support member 74 which is fixed by means of screws 75, 76 to the obliquely arranged back stays 66 and 67. In this state, the enclosed battery 30 is substantially parallel to the back stays 66 and 67.

Figure 5:
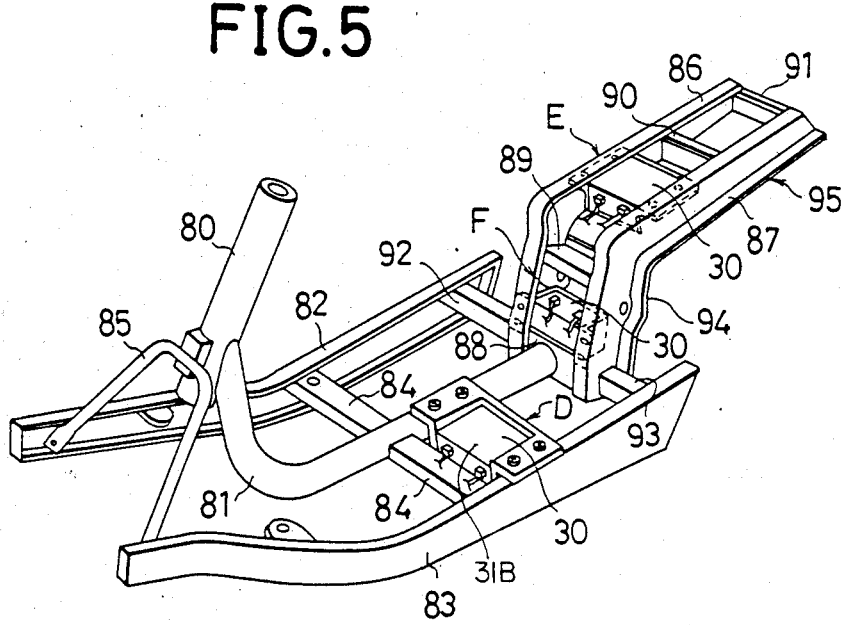
FIG. 5 a perspective view of another example of the frame of a motorcycle in which the enclosed battery is installed.
Figure 6:
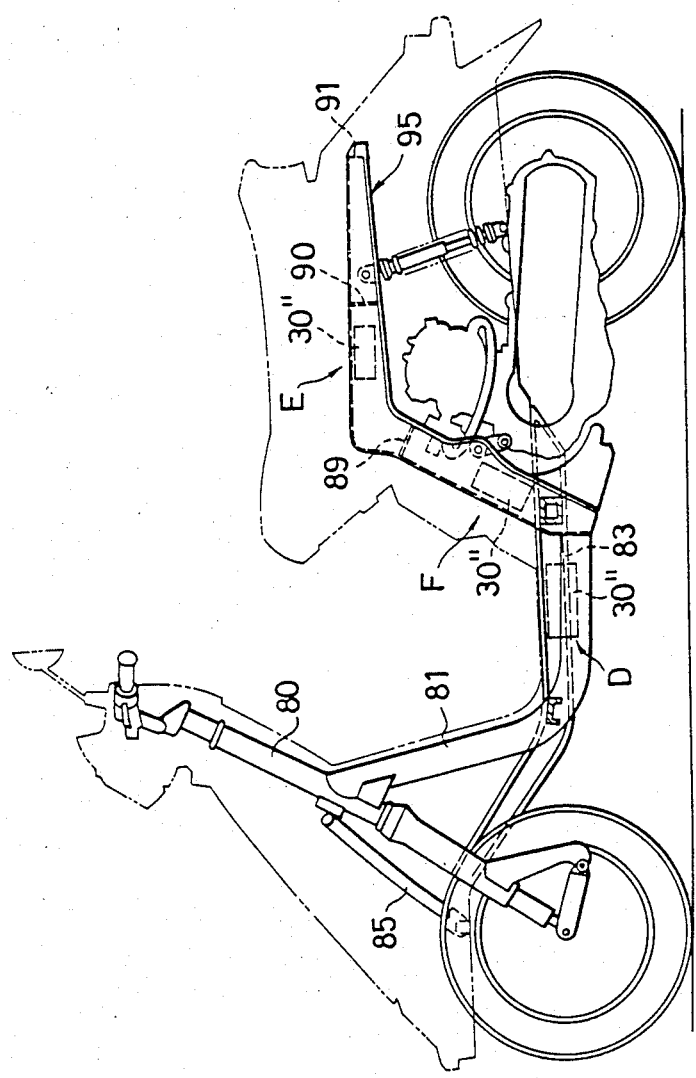
FIG. 6 is a side view of the frame of the motorcycle shown in FIG. 5.

Turning to FIG. 5 and 6, an embodiment of the invention in which the enclosed battery 30' is mounted in a frame of a motorcycle of the so-called motorscooter type will be explained. In FIG. 5, the body frame includes a obliquely arranged head pipe 80 and a generally L-shaped down tube 81 which is connected to the lower end portion of the head pipe 80. A pair of side yokes 82 and 83 are disposed on both sides of the down tube 81, parallel to the horizontally disposed rear half thereof, and a cross member 84 is provided to connect the down tube 81 to the middle portion of the side yokes 82 and 83. Further, a bridge member 85 is provided in order to connect the front ends of the side yokes 82, 83 and the lower end portion of the head pipe 80. These members form a front frame which constitute a front half of the body frame.

A rear frame which constitute the rear half of the body frame is made up of the following members. A pair of side yokes 86, 87 having generally L-shaped configuration are arranged side by side with a space narrower than the space between the side yokes 82, 83 of the front frame. A plurality of cross members 88 to 91 connect the side yokes 86, 87 together, at the front and the rear end at two middle positions thereof. The rear end of the down tube 81 is connected to the cross member 88 provided at the front end of the side yokes 86 and 87, which are connected to the rear end of the side yokes 82 and 83 by means of a pair of cross members 92 and 93. Further, the side yokes 86 and 87 are bent at an intermediate portion thereof to form an uprising portion 94 which rises up obliquely from the position at which the down tube 81 is connected, and a horizontal portion 95 extending rearwardly from the upper end of the uprising portion 94.

In the case of installing the enclosed battery in the body frame having above described construction, the location may be selected from the following positions D through F. As shown in FIG. 5, a first position D is located between the down tube 81 and the side yoke 83 directly after the cross member 84. A second position is located between the side yokes 86, 87 of the horizontal portion of the rear frame. A third position F is located between the side yokes 86, 87 of the obliquely disposed uprising portion of the rear frame. In each of these positions, the enclosed battery will be received and supported by means of a support member at substantially right angle to or obliquely to the vertical direction of the body frame.

Turning to FIGS. 7 to 10, another embodiment of the present invention will be further explained. This embodiment features that the enclosed battery 30''' is housed under a seat of a motorcycle and arranged sideways under the base plate of the seat.

Figure 8:
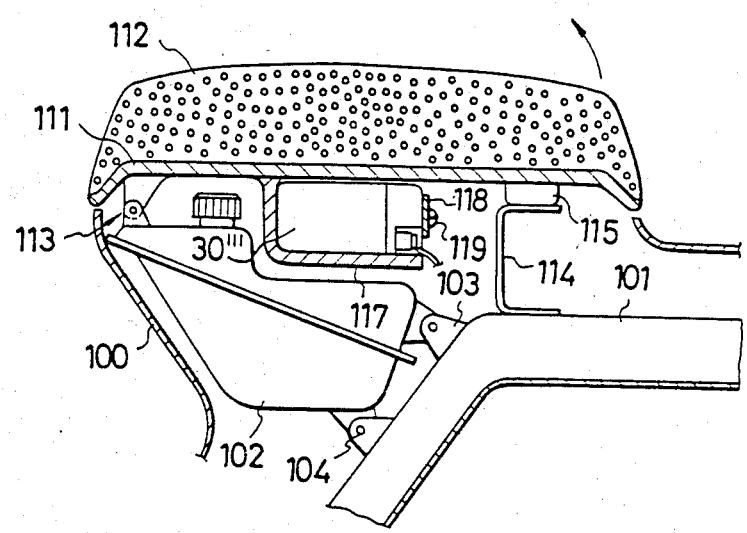
FIG. 8 is a partially sectional view corresponding to FIG. 7.
Figure 12:
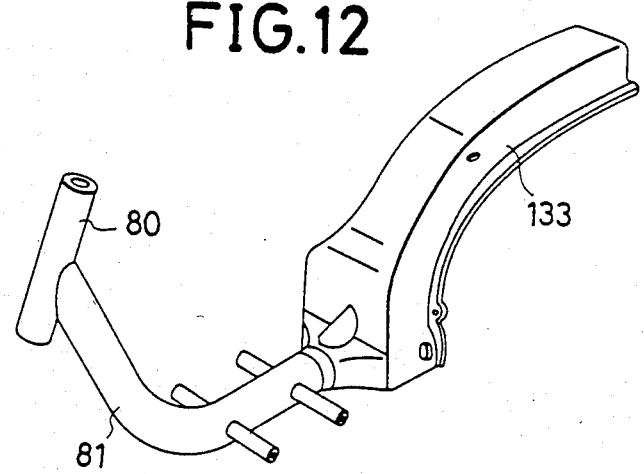
FIG. 12 is a perspective view of the frame of the motorcycle, corresponding to FIG. 11.

As shown in FIG. 8, a body 100 of the motorcycle which houses a frame 101 defines a space for housing a fuel tank 102 under a seat generally designated by 110. The fuel tank 102 is supported by a pair of stays 103, 104 which are welded to the upper face of the frame 101. The seat 110 consists of a base plate 111 and the seat cushion 112 made of such a material as polyurethane foam and placed on the base plate 111. The base plate 111 is connected to the fuel tank 102 by means of a hinge member 113 at a rear end thereof so as to be turned up around the hinge member 113 (as indicated by the arrow of FIG. 8) when a front end portion there of is lifted up. The vertical positioning of the front end portion of the seat 110 is performed by an abutment between a pair of pad members 115, 116 fixed to the base plate 111 a bearing member 114 which has generally c-shaped cross section and is fixed on the frame 101.

At the center of the base plate, there is provided a battery housing member 117 for housing the enclosed battery 30'''. In the battery housing member 117, the enclosed battery 30''' is received horizontally in parallel to the base plate 111. At an opening portion of the battery housing member 117, a stopper plate 118 is fixed by means of screws 119, 120 so as to securely support the enclosed battery 30''' in the battery housing member 117. Further, a pair of terminals 121 and 122 of a battery cord 123 are respectively connected to a positive and negative terminals 124, 125 of the enclosed battery.

Figure 9:
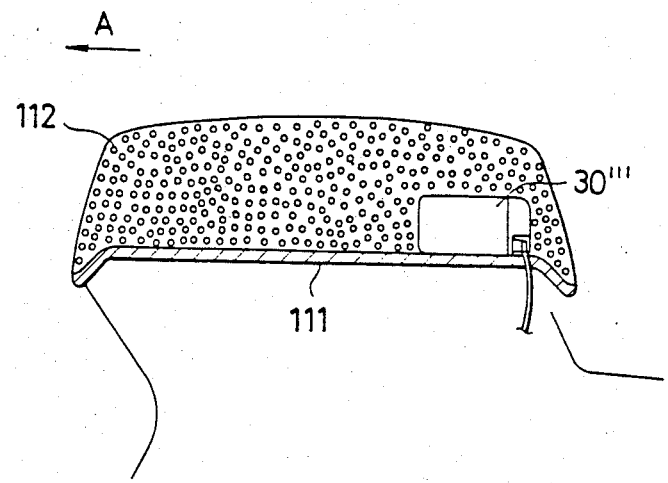
FIG. 9 is a partially sectional side view of a set unit, showing a modification of the embodiment shown in FIGS. 7 and 8.

Turning to FIG. 9, a modification of the above embodiment will be explained. In this modification, the enclosed battery 30''' is placed sideways on the base plate 111 and buried in the seat cushion 112. Further, the position of the enclosed battery along a longitudinal direction of the base plate 111 is preferably selected at the rear end portion since a rider of the motorcycle generally sit on the front half of the seat cushion 112 with respect to the direction of the forward movement of the motorcycle as indicated by the arrow A. Thus, the function of the seat cushion is maintained without bringing about a discomfort by burying the battery in the seat cushion.

Figure 7:
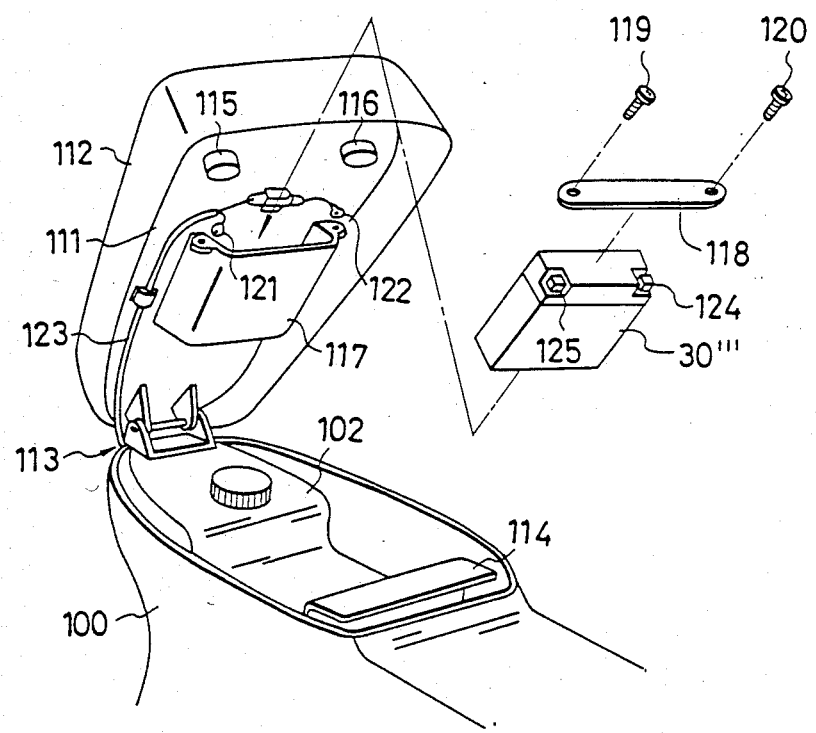
FIG. 7 is a perspective view of another embodiment of the present invention, showing a state of installing the enclosed battery under a seat unit.
Figure 10:
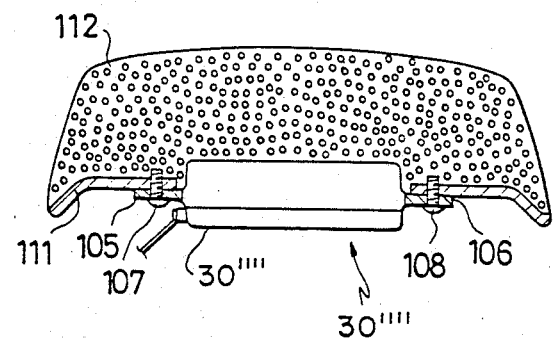
FIG. 10 is a partially sectional side view of a seat unit, showing further modification.
Figure 11:
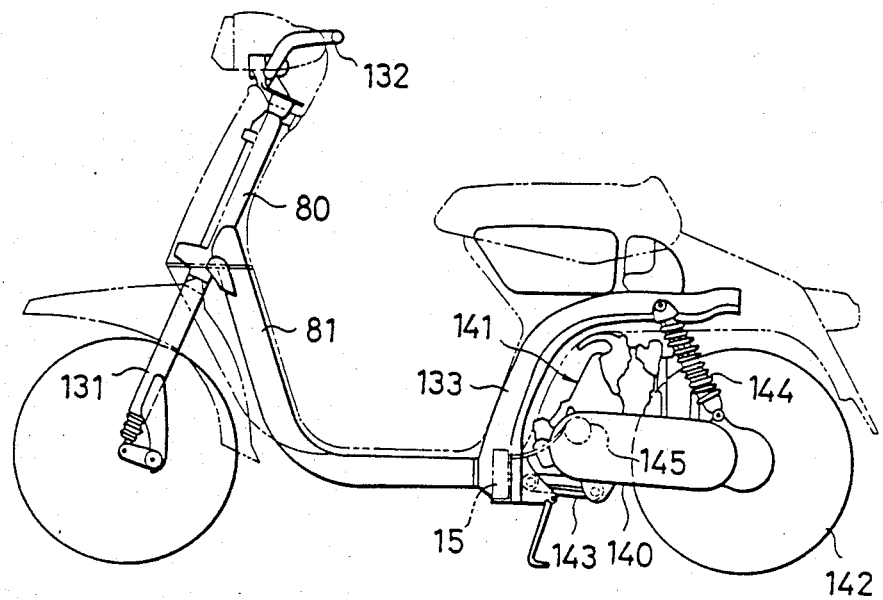
FIG. 11 is a side view of further example of the frame of the motorcycle, showing further embodiment of the present invention.

Reference is then made to FIG. 10, in which another modification of the embodiment of FIGS. 7 and 8 is illustrated. As shown, this modification features that the battery case 31'''' of the enclosed battery 30'''' is utilized as a part of the base plate 111. More particularly, the enclosed battery 30'''' is mounted in a rectangular opening formed in the bottom plate 111. In order to fix the enclosed battery to the base plate, a pair of holding stays 105, 106 are formed on both sides of the battery case 31'''', and a pair of screws 107, 108 are provided to clamp the holding stays 105, 106 to the base plate 111. This construction has advantages such that the cost of the material of the base plate is reduced and the strength of the base plate is increased by reinforcement by the battery case 31.

Turning to FIGS. 11 to 14, further embodiment of the present invention will be explained. As shown, a body frame of the motorcycle includes a head pipe 80 through which a front fork 131 is inserted. A handle bar 132 is connected to a top end of the front fork 131 which passes through the head pipe 80. At the lower end of the head pipe, a front end of a down tube 81 having a generally L-shaped form is connected by welding. A horizontally extending rear half of the down tube 81 is welded to a front end of a rear frame 133 made by a press process of sheet metal and having a U-shaped cross section. The rear frame 133 rises up obliquely from the front end and a rear half thereof extends rearwardly. A power unit 140 which transmits a driving force of an engine 141 to a rear wheel 142 is connected to the front end of the rear frame 133 by means of a link 143 and to a rear part of the rear frame by means of a buffer unit 144 so that a rocking movement against the rear frame 133 is enabled.

Figure 13:
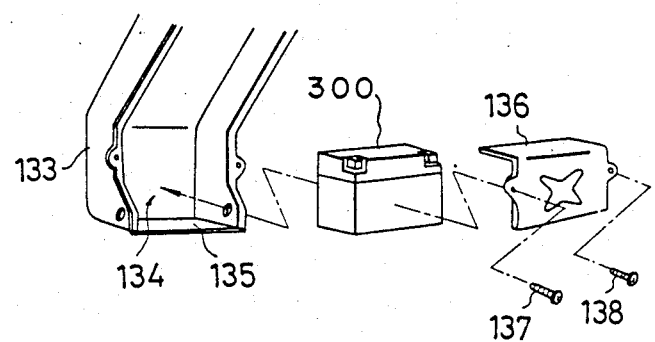
FIG. 13 is a perspective view showing the manner of installing the enclosed battery in the frame of the motorcycle shown in FIGS. 11 and 12.

For installing the enclosed battery on the motorcycle having such a frame structure described above, the location of installation may be selected at such a position as the rear side of the position of the connection between the down tube 81 and the rear frame 133. In this case, as shown in FIG. 13, the enclosed battery 300 is received in a concave space 134 formed above a base plate 135 of the front end of the rear frame 133. Further, a stopper plate 136 will be fixed to a flange portion formed around the concave space 134, by means of screws 137, 138, so as to hold the enclosed battery 300.

With this arrangement, it becomes possible to efficiently utilize the concave space 134 of the front end of the rear frame 133 which has been a so called dead space in conventional arrangements. In addition, the center of gravity of the body is lowered by the relatively large weight of the enclosed battery 300. Furthermore, since the enclosed battery 300 is located in the vicinity of a starting motor 145 housed in the power unit 140, a wiring 146 between an enclosed battery 300 and the starting motor 145 can be shortened to reduce a voltage drop across the wiring 146.

Figure 14:
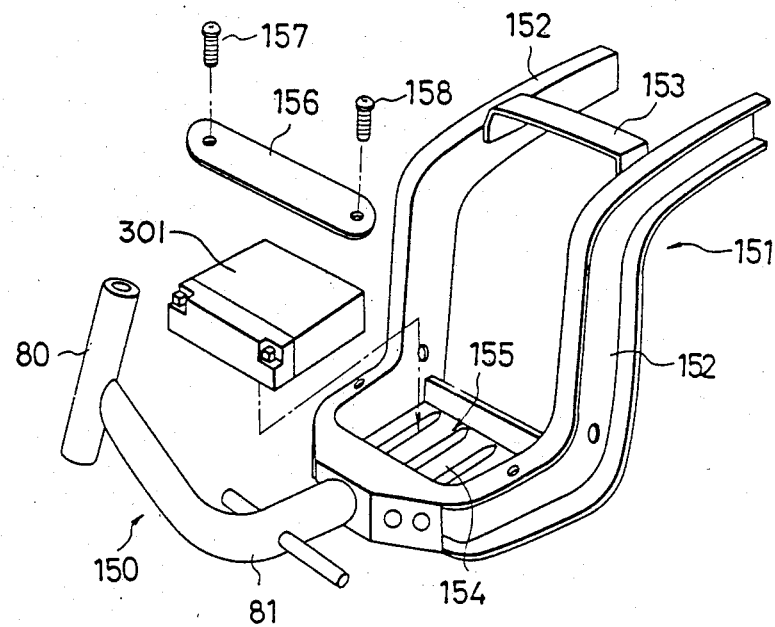
FIG. 14 is a perspective view of the frame of the motorcycle showing a modification of the embodiment of FIG. 13.

Turning to FIG. 14, another example of the configuration of the body frame will be explained. In this case, a head pipe 80 and a down tube 81 connected thereto and extend rearwardly form a front frame 150 in the same manner as the previous example. A rear frame generally designated at 151 is made up of a side yoke 152 having generally U-shaped configuration and made by a press process of sheet metal, cross member 153, and an under plate 154. The rear end of the down tube 81 is welded to a front end part of the side yoke 152 at which the under plate 154 is provided. Both side legs of the side yoke 152 are bent at positions after the front part and rise upto horizontal portions which are connected together by means of the cross member 153. The enclosed battery 301 is housed in a concave space 135 formed above the under plate 154 at the front end of the side yoke 152 and held by a stopper member 156 which is fixed to an upper face of the side yoke 152 by means of a pair of screws 157, 158. Thus, also in this example, it becomes possible to utilize a dead space, that is, the space above the under plate 154. Further, it is to be understood that the arrangement shown in FIG. 14 has the same advantages as the previous example shown in FIGS. 12 and 13.

Figure 15:
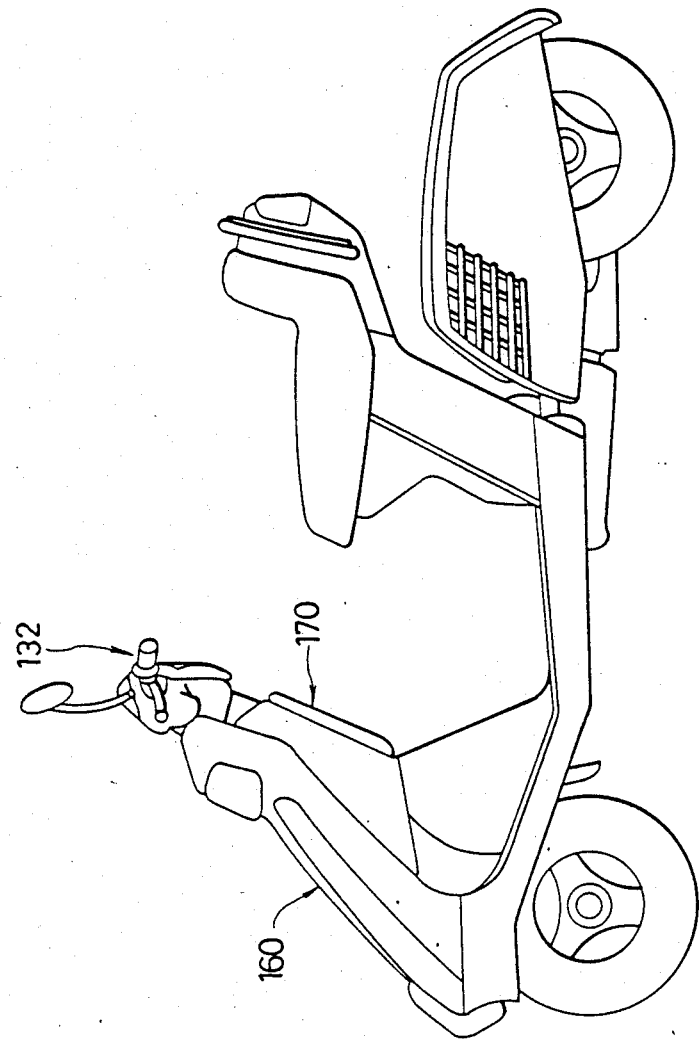
FIG. 15 is a side view of a motorcycle in which the enclosed battery is installed, and showing another embodiment of the present invention.
Figure 16:
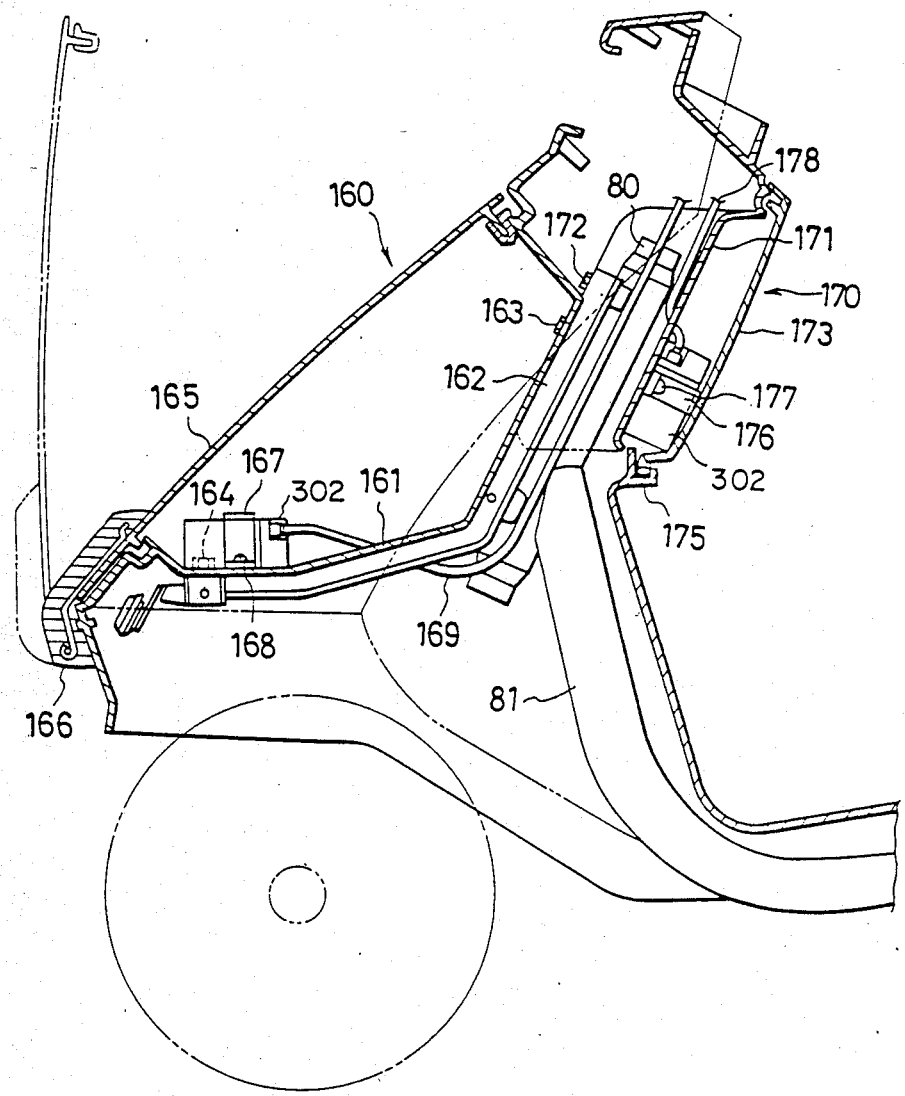
FIG. 16 is a partially sectional view showing the state of installing the enclosed battery more in detail.

Turning next to FIGS. 15 and 16, a further embodiment of the present invention will be explained hereafter.

FIG. 15 illustrates a side view of a motorcycle provided with luggage rooms in a body thereof. As shown in FIG. 16, in front of a head pipe 80 to which a down tube 81 is welded, there is provided a first luggage room 160. Also, a second luggage room 170 is provided behind the head pipe 80. In addition, a handle bar 132 is rotatably disposed above the head pipe and a main switch (not shown) is mounted at a central position of the handle bar 132. The first luggage room 160 is made up of a concave inner plate 161 fixed to an installing stay 162 by means of screws 163 and 164, and an outer plate 165 which is rotatably supported at the lower end thereof by a shaft 166, so as to shut an opening of the inner plate. The installing stay 162 is fixed to the head pipe 80. The second luggage room 170 is made up of an inner plate 171 connected to the installing stay 162 by means of a screw 172, in such a manner as to surround the head pipe 80 by a center portion thereof, and an outer plate 173 rotatably supported by means of a shaft 174 so as to open and close an opening portion of the inner plate 171.

The enclosed battery 302 is installed in either of the first luggage room 160 or the second luggage room 170. In FIG. 16, however, the enclosed battery is shown in both of the first and second luggage rooms 160, 170 for the purpose of explanation.

In the first luggage room 160, the enclosed battery 302 is fixed at a bottom of the inner plate by means of an installing stay 167 and a screw 168, in a manner that a side face of the enclosed battery 302 is substantially normal to the vertical direction of the body of the motorcycle. In the case of this arrangement, since the enclosed battery is disposed at the bottom of the luggage space, the decrease of the capacity of the luggage room is minimized. Further, there is no fear that the enclosed battery will obstruct the way when a thing is taken in and out of the luggage room. If the enclosed battery 302 is installed in the second luggage room 170, it is fixed at a lower part of the inner plate 171 by means of an installing stay 174 and a screw 175 so that the side face of the enclosed battery 302 is substantially parallel to the head pipe 80. Since the enclosed battery is placed at the lower part of the luggage space, the same advantages as the case of installing the enclosed battery in the first luggage space 160 are also obtained.

Further, by installing the enclosed battery 302 in the first luggage room 160 or in the second luggage room 170, the distance between the main switch mounted at the center of the handle bar and the enclosed battery is shortened. Therefore, the length of a wiring cord 169 or 178 will be shortened to reduce the voltage drop and moreover the wiring process will be simplified. In the case of this arrangement, there are further advantages such that the process for installing the enclosed battery in the luggage space is facilitated since the luggage room is easily opened. Further, the distributed load of front wheel can be increased by the weight of the enclosed battery.

Figure 17:
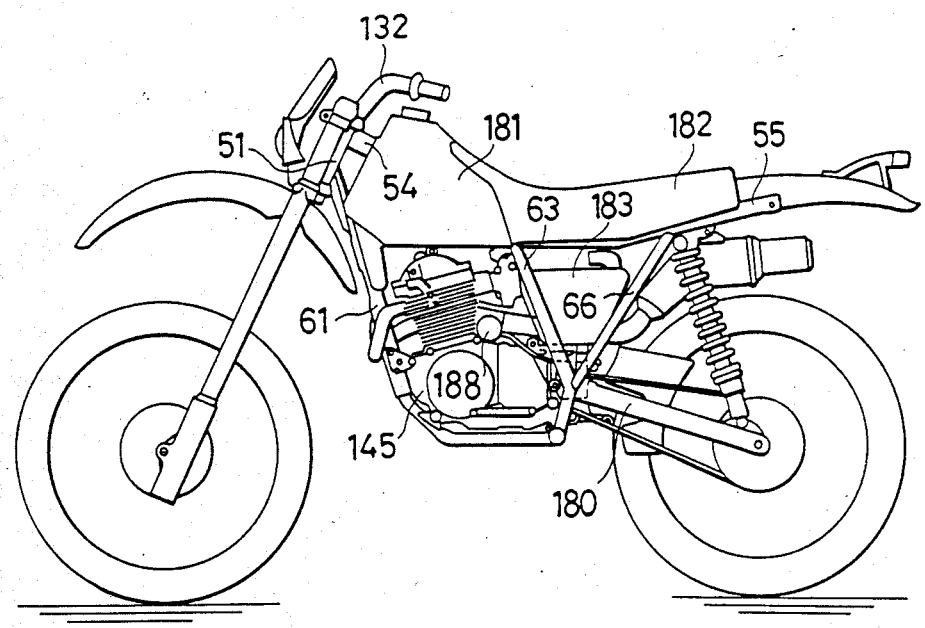
FIG. 17 is a side view of a motorcycle showing still another embodiment of the present invention.
Figure 18:
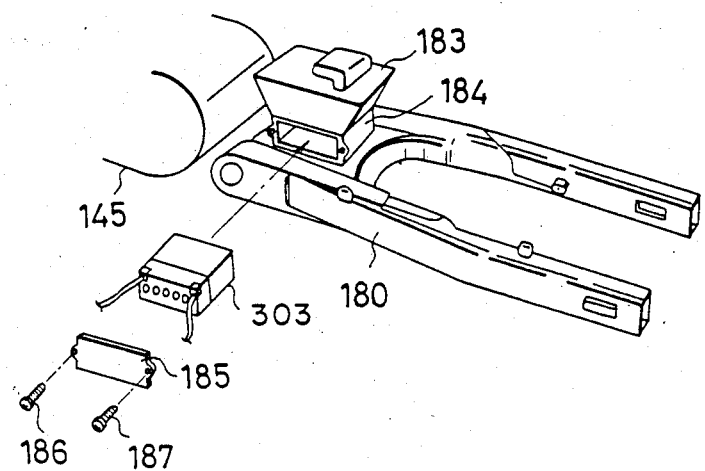
FIG. 18 is a perspective view corresponding to FIG. 17, showing the state of installation of the enclosed battery.
Figure 19:
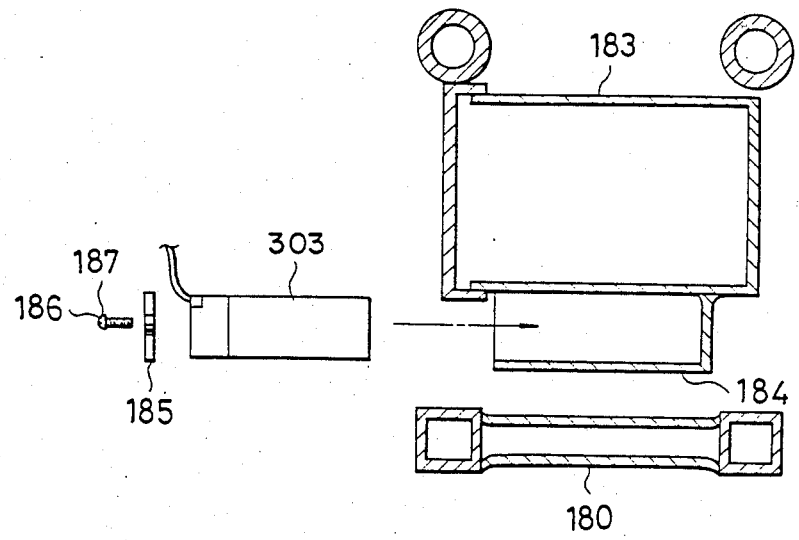
FIG. 19 is a vertical cross sectional view corresponding to FIG. 18.

Referring now to FIGS. 17 through 19, further embodiment of the present invention will be explained hereinafter. As shown, a front end of a main pipe 54 is welded to a head pipe 51 which rotatably hold a handle bar 132. The main pipe 54 extends rearwardly and a fork-shaped back frame 55 is welded at the rear end thereof. To the head pipe 51, top ends of down frames 61, 62 (not shown) having L-shaped configuration are welded. At the front end of the back frame 55, top ends of pillars 63, 64 (not shown) are welded. The lower part of the pillars 63 and 64 are bent forwardly, and at lower ends, welded to rear ends of the down tubes 61 and 62. An engine 145 is mounted in frame structure formed by the main pipe 54, down tubes 61, 62, and pillars 63, 64. A pair of back stays 66, 67 (not shown) are welded between a middle portion of the pillars 63, 64 and a middle position of the back frame 55 and a rear fork 180 is rotatably connected to the pillars 63 and 64. A fuel tank 181 is mounted over the main pipe 54 and a seat 182 is placed over the back frame 55 and at the back of the fuel tank 181. In a space under the seat 182, there is disposed an air cleaner case 183 which is connected to an air intake system of the engine 145.

The enclosed battery 303 is mounted in a space under the air cleaner case 183, that is, a so-called dead space. The manner of installing the enclosed battery will be explained in detail with reference to FIGS. 18 and 19. As shown in the perspective view of FIG. 18 and in the cross sectional view of FIG. 19, the enclosed battery 303 is housed sideways in a holder case 184 which is mounted in a space behind the engine 145, between the air cleaner case 183 and the rear fork 180. In order to hold the enclosed battery 303 in the holder case 184, a stopper plate 185 will be fixed to an opening portion of the holder case 184 by means of screws 186, 187. In the case of this arrangement, since the enclosed battery is housed in a dead space under the air cleaner case 184, the form of the air cleaner case is desirably selected and the width thereof may be selected the same as the width of the frame. Therefore, the capacity of the air cleaner case can be increased to reduce the engine noise and to improve the engine stability. Further, there is an advantage that the length of the wiring cord can be reduced by the shortning of the distance between a starting motor 188 (shown in FIG. 17) and the enclosed battery 303. With this feature, the wiring process can be made easy and the voltage drop across the wiring cord can be reduced.

Figure 20:
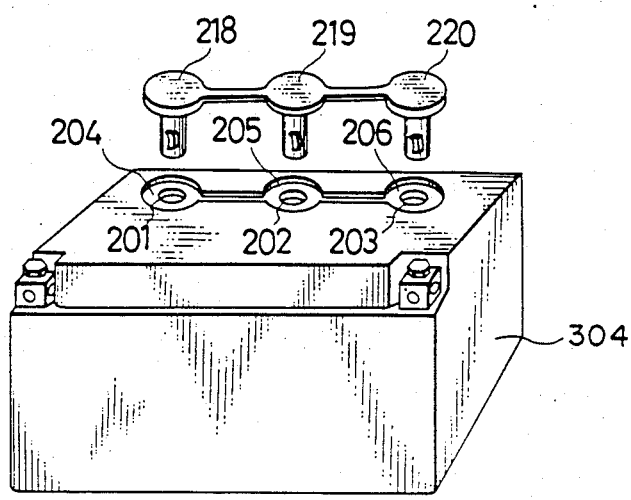
FIG. 20 is a view showing another example of the enclosed battery to be mounted on a motorcycle according to the present invention, along with a series of plug caps to be fitted into filler openings of the enclosed battery.
Figure 21:
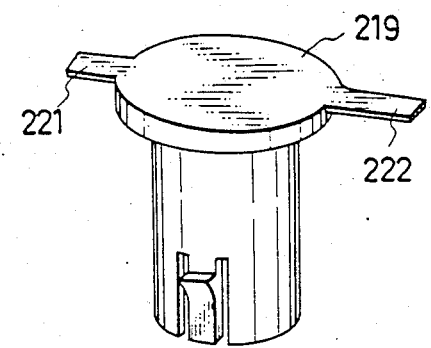
FIG. 21 is a view showing one of the plug caps of FIG. 20.
Figure 22:
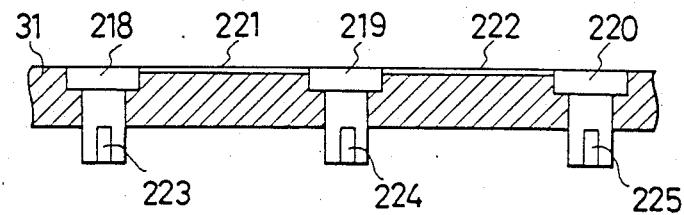
FIG. 22 is a partially sectional view showing the state of the plug caps fitted in the filler openings of the enclosed battery.

Turning now to FIGS. 20 through 22, another example of the enclosed battery will be explained. Before starting the explanation of this example, a problem accompanied to the enclosed battery while filling the electrolyte will be described first. In the case of the conventional open type battery, the quantity of the electrolyte in each cell can be viewed from the outside. However, in the case of the enclosed battery in which the electrolyte is absorbed by the separator 35, the quantity of the electrolyte for each cell can be checked only before filling it into each cell. Further, the enclosed battery requires a type of electrolyte the specific gravity of which is greater than the conventional type, it is very important to prevent the misuse of the conventional electrolyte to the enclosed battery.

In FIG. 20, the enclosed battery 304 has three cells for instance, each having in an upper surface thereof, a filler opening 201, 202, 203 through which the electrolyte is poured into the cell.

After the completion of the filling of the electrolyte, the filler openings 201 to 203 of each cell are closed by plug caps 218, 219, 220 which are connected with each other by means of connecting portions 221, 222. The plug caps 218 to 220 are made of a flexible material such as a resin and formed as a one piece part as shown in FIG. 20. Each of the plug caps 218, 219, 220 have a cylindrical body and a circular head portion as illustrated in FIG. 21. In order to receive the head portion of the plug cap, the filler openings 201, 202, 203 are provided with an enlarged portion 204, 205, 206 having a diameter almost the same as the head portion of the plug caps 218, 219, 220. With this provision, the upper surface of the plug caps 218, 219, 220 becomes flush with the upper surface of the enclosed battery 304, and the plug caps are prevented from being taken out from the battery case so that the closed state of the battery is positively secured. Furthermore, the plug caps 218, 219, 220 are provided with a hook 223, 224, 225 at the lower part of the cylindrical body as shown in FIG. 22. During the insertion of the plug cap 218, 219, or 220 into the filler opening 201, 202, or 203, this hook 223, 224, 225 is resiliently moved back to the inside of the plug cap so as to allow the insertion of the cylindrical body. When inserted, the plug cap 218, 219, 220 is prevented from drawn off by means the engagement of this hook with an inner wall of the battery case 31. Furthermore, the strength of the connecting portions 221, 222 of the plug caps are preferred to be such that it will be readily torn when any one of the plug caps 218, 219, 220 inserted in the filler openings 201, 202, 203 is pulled out.

As will be understood that, the enclosed battery of this embodiment shown in FIG. 20 through 24 will be installed in the body of the mororcycle in the same manner as the cases which have been explained with reference to FIGS. 2 through 19.

It will be appreciated from the foregoing, that according to the present invention, the smaller space or the so-called dead space of the body of the motorcycle is effectively utilized by installing the enclosed battery in a manner that a side face of the battery case in which the positive and the negative plates are housed in a vertical direction, makes an angle with the vertical direction of the body of the motorcycle. Thus, the reduction of size or the slimming of the body is enabled and further it provides a great advantage for the layout of the body of the motorcycle especially because the height of the space required for housing the battery is by far reduced when the enclosed battery is installed sideways. Moreover, in accordance with the arrangement of the invention, it becomes possible to efficiently utilize a space in which a battery is disposed in the conventional arrangement, such as a space behind the seat.

It should be understood that the foregoing description is for illustrative purpose only, and is not intended to limit the scope of the invention. Rather, there are numerous equivalents to the preferred embodiments, and such are intended to be covered by the appended claims.

As an example, even though the present invention has been described by way of example to motorcycles having two wheels, the invention is also applicable to a tricycle which has two rear wheels and has practically the same body construction as the motorcycle, for instance.

What is claimed is:

1. A motorcycle having a body an equipped with an enclosed battery comprising:
    a frame structure including an upper substantially horizontal part and a lower substantially horizontal part;
    body equipment mounted on said frame structure;
    said enclosed battery includes a battery case having first side faces, second larger side faces, positive plates and negative plates arranged alternately and parallel to said first side faces, separators provided in each space between a positive plate and a negative plate which face each other, and electrolyte absorbed by said separator;
    said enclosed battery is operatively positioned at a position lower than said upper substantially horizontal part of said frame structure such that said second larger side faces of said battery case lie substantially horizontally;
    said frame structure includes:
    a head pipe through which a steering column is inserted;
    a generally L-shaped down tube connected to said head pipe and extending substantially downwardly from said head pipe in its front portion and subsequently substantially horizontally in its rear portion; and
    a pair of side yokes connected to said down tube via cross members and positioned substantially horizontally on both sides of said rear portion of said down tube, in which said rear portion of said down tube and said side yokes form said lower substantially horizontal part of said frame structure, and wherein said enclosed battery is operatively positioned between said rear portion of said down tube and one of said side yokes such that said first side faces of said battery case are substantially parallel to said rear portion of said down tube and side yokes, thereby mounting said enclosed battery substantially horizontally on said motorcycle.

2. A motorcycle having a body and equipped with an enclosed battery comprising:
- a frame structure including an upper substantially horizontal part and a lower substantially horizontal part;
- body equipment mounted on said frame structure;
- said enclosed battery includes a battery case having first side faces, second larger side faces, positive plates and negative plates arranged alternately and parallel to said first side faces, separators provided in each space between a positive plate and a negative plate which face each other, and electrolyte absorbed by said separator;
- said enclosed battery is operatively positioned at a position lower than said upper substantially horizontal part of said frame structure such that said second larger side faces of said battery lie substantially horizontally;
- said frame structure includes:
- a head pipe through which a steering column is inserted;
- a generally L-shaped down tube connected to said head pipe and extending substantially downwardly from said head pipe in its front portion and subsequently substantially horizontally in its rear portion; and
- a pair of side yokes having horizontal portions connected to said down tube, said rear portion of said down tube and said horizontal portions of said side yokes form said lower substantially horizontal part of said frame structure, and
- wherein said enclosed battery is operatively positioned on said lower substantially horizontal part of said frame structure such that said first side faces of said battery case are substantially parallel to said rear portion of said down tube and said side yokes, thereby mounting said enclosed battery case substantially parallel to said rear portion of said down tube and said side ones, thereby mounting said enclosed battery substantially horizontally on said motorcycle.

* * * * *